US011646618B2

(12) United States Patent
Sadeghi et al.

(10) Patent No.: US 11,646,618 B2
(45) Date of Patent: May 9, 2023

(54) ELECTRIC MACHINE WITH PERMANENT MAGNET ROTOR

(71) Applicant: Optiphase Drive Systems, Inc., Keller, TX (US)

(72) Inventors: Siavash Sadeghi, Lake Forest, CA (US); Arash Hassanpour Isfahani, Tustin, CA (US)

(73) Assignee: Optiphase Drive Systems, Inc., Southlake, TX (US)

( * ) Notice: Subject to any disclaimer, the term of this patent is extended or adjusted under 35 U.S.C. 154(b) by 425 days.

(21) Appl. No.: 16/668,098

(22) Filed: Oct. 30, 2019

(65) Prior Publication Data

US 2020/0136485 A1 Apr. 30, 2020

Related U.S. Application Data

(60) Provisional application No. 62/753,518, filed on Oct. 31, 2018.

(51) Int. Cl.
*H02K 21/22* (2006.01)
*H02P 6/182* (2016.01)
(Continued)

(52) U.S. Cl.
CPC .............. *H02K 21/22* (2013.01); *H02K 1/24* (2013.01); *H02M 1/12* (2013.01); *H02P 6/08* (2013.01); *H02P 6/182* (2013.01); *H02P 25/22* (2013.01)

(58) Field of Classification Search
CPC .......... H02K 21/22; H02K 1/24; H02K 1/276; H02K 1/2773; H02K 1/278; H02M 1/12; H02P 6/08; H02P 6/182; H02P 25/22
(Continued)

(56) References Cited

U.S. PATENT DOCUMENTS

| 4,438,362 A | 3/1984 | Brown |
| 4,583,015 A | 4/1986 | Toshimitsu |

(Continued)

FOREIGN PATENT DOCUMENTS

| CN | 101986548 A | 3/2011 |
| CN | 102130559 A | 7/2011 |

(Continued)

OTHER PUBLICATIONS

Semail et al., "Sensitivity of a 5-phase Brushless DC machine to the 7th harmonic of the back-electromotive force" Power Electronics Specialists Conference, 2004.
(Continued)

*Primary Examiner* — Rashad H Johnson
(74) *Attorney, Agent, or Firm* — Banner & Witcoff, Ltd.

(57) ABSTRACT

A multi-phase electric machine may include a stator, and a rotor for rotating within the stator, the rotor including poles having combination magnet pieces with varying strengths and dimensions creating a non-sinusoidal back EMF. In one aspect, a multi-phase electric machine may include a stator, and a rotor for spinning within the stator, the rotor includes a plurality of poles having magnet assemblies includes at least a low strength magnet and a high strength magnet therein for creating a non-sinusoidal back EMF. In other aspects, a multi-phase electric machine of the present disclosure includes a stator, and a rotor for spinning within the stator, the rotor including a plurality of poles having magnet assemblies includes at least a first magnet and second magnet therein for creating a non-sinusoidal back EMF wherein a strength ratio of the first magnet and second magnet greater than the absolute value of 1.

26 Claims, 6 Drawing Sheets

(51) Int. Cl.
  *H02M 1/12* (2006.01)
  *H02P 25/22* (2006.01)
  *H02K 1/24* (2006.01)
  *H02P 6/08* (2016.01)

(58) Field of Classification Search
  USPC .... 310/152, 154.01, 154.06, 154.11, 154.32, 310/154.43
  See application file for complete search history.

(56) References Cited

U.S. PATENT DOCUMENTS

| | | | |
|---|---|---|---|
| 5,394,321 | A | 2/1995 | McCleer et al. |
| 5,744,921 | A | 4/1998 | Makaran |
| 7,733,044 | B2 | 6/2010 | Nakamura et al. |
| 8,093,847 | B2 | 1/2012 | Otaguro |
| 8,203,246 | B2 | 6/2012 | Nashiki et al. |
| 8,233,295 | B2 | 7/2012 | Ransom et al. |
| 8,278,850 | B2 | 10/2012 | Gallegos-Lopez |
| 8,339,094 | B2 | 12/2012 | Perisic et al. |
| 8,633,627 | B2 * | 1/2014 | El-Refaie ............... H02K 21/16 310/156.01 |
| 8,742,712 | B2 | 6/2014 | Perisic et al. |
| 2003/0030343 | A1 | 2/2003 | Naito et al. |
| 2007/0138892 | A1 | 6/2007 | Horst |
| 2010/0026128 | A1 * | 2/2010 | Ionel ...................... H02K 1/276 310/156.53 |
| 2012/0286705 | A1 | 11/2012 | Tanaka et al. |
| 2013/0320797 | A1 * | 12/2013 | Vyas ..................... H02K 1/2766 310/156.43 |
| 2014/0028119 | A1 * | 1/2014 | Sagalovskiy ......... H02K 5/132 310/43 |
| 2015/0042197 | A1 * | 2/2015 | Hagenlocher .......... H02K 21/00 310/198 |
| 2015/0270747 | A1 * | 9/2015 | Toliyat ................... H02K 5/132 310/156.01 |
| 2015/0333584 | A1 * | 11/2015 | McMullen ............. H02K 1/278 310/156.28 |
| 2017/0005555 | A1 | 1/2017 | Alsawalhi et al. |
| 2022/0209703 | A1 * | 6/2022 | Mao ......................... H02K 3/28 |

FOREIGN PATENT DOCUMENTS

| | | |
|---|---|---|
| CN | 201975963 U | 9/2011 |
| CN | 202026232 U | 11/2011 |
| CN | 101662257 B | 8/2012 |
| CN | 202374153 U | 8/2012 |
| CN | 103390977 A | 11/2013 |
| CN | 103812294 A | 5/2014 |
| CN | 104378025 A | 2/2015 |
| CN | 104883017 A | 9/2015 |
| CN | 103490692 B | 2/2016 |
| CN | 105305734 A | 2/2016 |
| CN | 105391265 A | 3/2016 |
| CN | 205265494 U | 5/2016 |
| CN | 103501149 B | 6/2016 |
| CN | 105958896 A | 9/2016 |
| CN | 106026841 A | 10/2016 |
| CN | 106100496 A | 11/2016 |
| CN | 106249150 A | 12/2016 |
| CN | 106330046 A | 1/2017 |
| CN | 106505927 A | 3/2017 |
| CN | 106992732 A | 7/2017 |
| CN | 105305751 B | 8/2017 |
| CN | 107196573 A | 9/2017 |
| CN | 107231111 A | 10/2017 |
| CN | 107276492 A | 10/2017 |
| CN | 107332486 A | 11/2017 |
| CN | 105245156 B | 1/2018 |
| CN | 107565868 A | 1/2018 |
| CN | 107834733 A | 3/2018 |
| EP | 3053262 A2 | 8/2016 |
| JP | 2005295642 A | 10/2005 |
| JP | 2010193674 A | 9/2010 |
| JP | 6281367 B2 | 2/2018 |
| KR | 10-2015-0044537 A | 4/2015 |
| WO | 2008035487 A1 | 3/2008 |
| WO | 2015049467 A2 | 4/2015 |
| WO | 2016167041 A1 | 10/2016 |
| WO | 2018018671 A1 | 2/2018 |

OTHER PUBLICATIONS

Wang et al. "Torque Improvement of Dual Three-Phase Permanent Magnet Machine with 3rd Harmonic Current Injection" DOI 10.1109/TIE.2015.2442519, IEEE Transactions on Industrial Electronics; 2015.

Chang et al. "Design of a 5-Phase Permanent Magnet Brushless DC Motor for Automobiles" 0-7803-7954-3/03; IEEE; 2003.

Lidozzi et al. "Vector Control of Trapezoidal Back-EMF PM Machines Using Pseudo-Park Transformation" 978-1-4244-1668-4/08; IEEE; 2008.

Arashloo et al. "Fault Tolerant Vector Control of Five-Phase Permanent Magnet Motors" Thesis submitted in partial fulfillment of the requirement for the PhD degree issued by Universitat Politecnica de Catalunya, in its Electronic Engineering Program; Jul. 2014.

Mohammadpour et al. "A Unified Fault-Tolerant Current Control Approach for Five-Phase PM Motors with Trapezoidal Back EMF under Different Stator Winding Connections" Department of Electrical, Computer, and Systems Engineering; IEEE; 2011.

Parsa et al. "Multi-Phase Permanent Magnet Motor Drives" Advanced Electric Machines & Power Electronics Laboratory; IEEE 2003.

Arafat et al "Active Current Harmonic Suppression for Torque Ripple Minimization at Open Phase Faults in a Five-Phase PMa-SynRM" DOI 10.1109/TIE.2018.2829685, IEEE Transactions on Industrial Electronics; Apr. 24, 2018.

Parsa et al. "Five-Phase Permanent-Magnet Motor Drives" IEEE Transactions on Industry Applications, vol. 41, No. 1, Jan./Feb. 2005.

Liu et al. "Third Harmonic Current Injection in Fault-Tolerant Five-Phase Permanent-Magnet Motor Drive" IEEE Transactions on Power Electronics, vol. 33, No. 8, Aug. 2018.

Zhu et al. "Research on five-phase induction motor system control with third harmonic current injection" The 6th International Conference on Renewable Power Generation (RPG); Oct. 19-20, 2017.

Gu et al. "Design of Five Phase SPM Machine Considering Third Harmonic Current Injection" This work was supported by the Natural Science Foundation of Jiangsu Province under Project BK20150744; Feb. 2, 2017.

Tian et al. "Cancellation of Torque Ripples with FOC Strategy under Two Phase Failures of Five-Phase PM Motor" DOI 10.1109/TPEL.2016.2598778, IEEE; Aug. 10, 2016.

Arahal et al. "PI tuning of five-phase drives with third harmonic injection" Control Engineering Practice 17 (2009) 787-797.

Arashloo et al. "A robust predictive current controller for healthy and open-circuit faulty conditions of five-phase BLDC drives applicable for wind generators and electric vehicles" Energy Conversion and Management 92 (2015) 437-447.

Haque et al. "A Sensorless Initial Rotor Position Estimation Scheme for a Direct Torque Controlled Interior Permanent Magnet Synchronous Motor Drive" IEEE Transactions on Power Electronics, vol. 18, No. 6, Nov. 2003.

Bianchi et al. "Impact of Stator Winding of a Five-Phase Permanent-Magnet Motor on Postfault Operations" IEEE Transactions on Industrial Electronics, vol. 55, No. 5, May 2008.

Barrero et al. "Recent Advances in the Design, Modeling and Control of Multiphase Machines—Part 1" DOI 10.1109/TIE.2015.2447733, IEEE Transactions on Industrial Electronics; Jun. 19, 2015.

Mevey "Sensorless Field Oriented Control of Brushless Permanent Magnet Synchronous Motors" B.S., Kansas State University, 2006, A report, submitted in partial fulfillment of the requirements for the degree Master of Science, Department of Elecliical and Computer Engineering College of Engineering.

(56) References Cited

OTHER PUBLICATIONS

Shi et al. "Field Oriented Control of Five-phase Synchronous Reluctance Motor Drive with Flexible 3rd Harmonic Current Injection for High Specific Torque" 0-7803-7116-X/01, 2001 IEEE.

Jahns et al. "Pulsating Torque Minimization Techniques for Permanent Magnet AC Motor Drives—A Review" IEEE Transactions on Industrial Electronics, vol. 43, No. 2, Apr. 1996.

Parsa et al. "Five-Phase Permanent Magnet Motor Drives for Ship Propulsion Applications" 2005 IEEE Electric Ship Technologies Symposium.

Souza et al. "Five-Phase Permanent-Magnet Synchronous Motor" IEEE Latin America Transactions, vol. 15, No. 4, Apr. 2017.

Dwari et al. "Fault-Tolerant Control of Five-Phase Permanent-Magnet Motors With Trapezoidal Back EMF" IEEE Transactions on Industrial Electronics, vol. 58, No. 2, Feb. 2011.

Wang et al. "Optimal Rotor Shape with Third Harmonic for Maximizing Torque and Minimizing Torque Ripple in IPM Motors" 10.1109/ICEIMach.2012.6349898; Nov. 12, 2012.

Parsa et al. "Five-Phase Interior Permanent-Magnet Motors with Low Torque Pulsation" IEEE Transactions on Industry Applications, vol. 43, No. 1, Jan./Feb. 2007.

Jan. 21, 2020—(PCT) Search Report and Written Opinion—App No. PCT/US2019/058801.

Oct. 17, 2022—(EP) Search Report—App No. EP 19 88 0845.

\* cited by examiner

Figure 1

(Prior Art)

Notes: (a) Surface-mounted; (b) inset; (c) interior PM rotor

FIGURE 6

ELECTRIC MACHINE WITH PERMANENT MAGNET ROTOR

CROSS-REFERENCE TO RELATED APPLICATIONS

The present application is a non-provisional application of U.S. App. No. 62/753,518, filed, Oct. 31, 2018, the contents of which are incorporated herein by reference in their entirety.

FIELD

The disclosure relates generally to electric machines. More specifically, the disclosure provides an improved electric machine of five phases.

BACKGROUND

Electric machines are utilized in a wide variety of applications. For example, hybrid/electric vehicles (HEVs) typically include an electric traction drive system that includes an alternating current (AC) electric machine which is driven by a power converter with a direct current (DC) power source, such as a storage battery. Machine windings of the AC electric machine can be coupled to inverter sub-modules of a power inverter module (PIM). Each inverter sub-module includes a pair of switches that switch in a complementary manner to perform a rapid switching function to convert the DC power to AC power. This AC power drives the AC electric machine, which in turn drives a shaft of HEV's drivetrain. Traditional HEVs implement a three-phase pulse width modulated (PWM) inverter module, which drives a three-phase ΔC machine (e.g., AC machine).

Many modern high performance AC machine drives use the principle of field oriented control (FOC) or "vector" control to control operation of the AC electric machine. In particular, vector control is often used in variable frequency drives to control the torque applied to the shaft (and thus finally the speed) of an AC electric machine by controlling the current fed to the AC electric machine. In short, stator phase currents are measured and converted into a corresponding complex space vector. This current vector can then be transformed to a coordinate system rotating with the rotor of the AC electric machine.

Recently, researchers have investigated the possibility of using multi-phase machines in various applications including hybrid/electric vehicles. Higher-order multi-phase systems are characterized by additional degrees of freedom and better reliability in comparison to conventional three-phase machines, as well as by their enhanced torque producing capability.

As used herein, the term "multi-phase" refers to more than three-phases, and can be used in reference to AC electric machines that have five or more phases. While the possibility of using five-phase systems in HEVs is being explored, a lot of work remains to be done before these inverter and machine configurations can actually be implemented particularly with respect to control techniques used in conjunction with such five-phase systems.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, the present disclosure is directed to electric machine of five phases or more phases.

An aspect of the present disclosure provides a five phase permanent magnet electric machine or surface mount which utilizes a unique magnet architecture and topology to improve power density, i.e. power created relative to weight of the machine. In one aspect, each pole of the rotor's magnets includes a combination magnet with varying strengths (non-consistent properties). In other aspects, a multi-phase electric machine of the present disclosure includes a stator, and a rotor for rotating within the stator, the rotor including poles having combination magnet pieces with varying strengths and dimensions creating a non-sinusoidal back EMF. In other aspects, a multi-phase electric machine of the present disclosure includes a stator, and a rotor for spinning within the stator, the rotor includes a plurality of poles having magnet assemblies including at least a low strength magnet and a high strength magnet therein for creating a non-sinusoidal back EMF. In other aspects, a multi-phase electric machine of the present disclosure includes a stator, and a rotor for spinning within the stator, the rotor including a plurality of poles having magnet assemblies including at least a first magnet and second magnet therein for creating a non-sinusoidal back EMF wherein a strength ratio of the first magnet and second magnet greater than the absolute value of 1.

Based on intensive modeling, utilizing state-of-the-art modeling software, the novel design produces 17% more torque than a similarly sized (length and circumference) three phase machines. The new design offers a non-sinusoidal back EMF voltage (including 18% of third harmonic) in the windings of the five phase machine. Applying a non-sinusoidal current with 18% third harmonic to the windings creates a higher torque density while concurrently exhibiting current losses on similar with three Phase Electric Machine Drives. The new machine design described improves the torque density and efficiency.

In other aspects of the present disclosure, a multi-phase machine magnet pieces are separated by non-magnetic conductive materials. In another aspect, a multi-phase machine magnet pieces are attached with no space between them. In yet other aspects, a multi-phase machine a magnet poles generate third harmonics in the back EMF. In yet another aspect, a multi-phase machine may include back EMF containing between 18% of third harmonics.

In further aspects of the present disclosure, a multi-phase machine back EMF contains higher order harmonics thereby improving torque or efficiency. In the aspects, a multi-phase machine magnet contains rare-earth material. In further aspects, a multi-phase machine magnet may contain Neyoadium or Samarium Cobalt. In another aspect, a multi-phase machine magnet contains non rare-earth material. In another aspect, a multi-phase machine magnet contains combination of rare-earth and non-rare-earth materials. In other aspects, a multi-phase machine magnet poles are disposed on the surface of the rotor. In yet other aspects, a multi-phase machine magnet poles may be buried inside the rotor. In another aspect, a multi-phase machine magnet poles may be disposed inset on the rotor. Further aspects include a multi-phase machine magnet poles placed as a combination of surface mounted, buried, and inset on the rotor.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
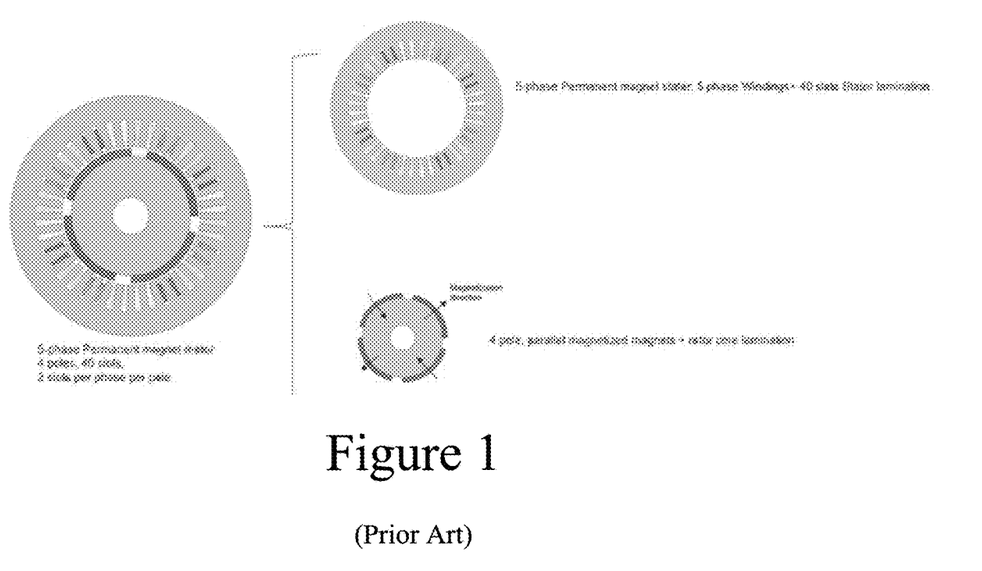
FIG. 1 depicts a conventional machine design (prior art)
Figure 2:
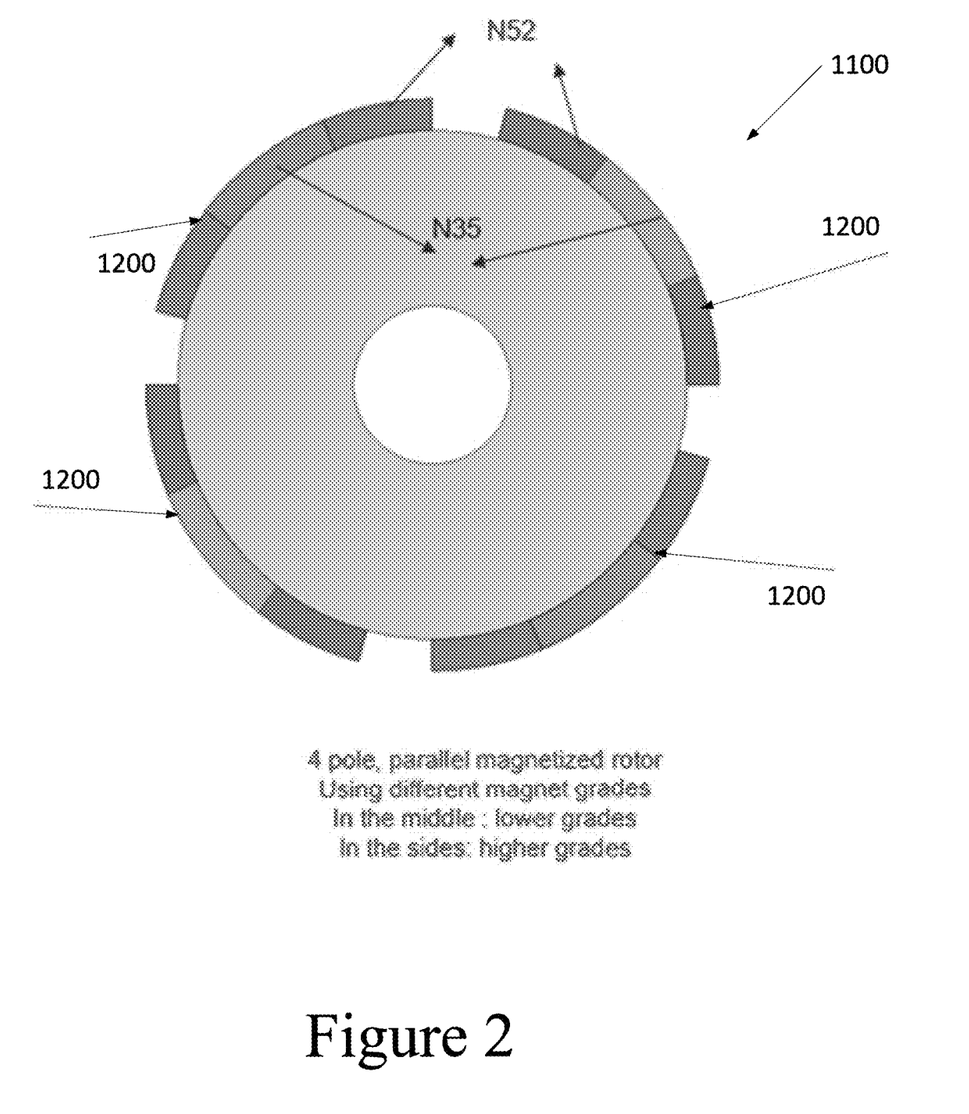
FIG. 2 illustrates a new electric machine magnet architecture and topology in which various aspects of the present disclosure may be implemented in accordance with one or more example embodiments.
Figure 3:
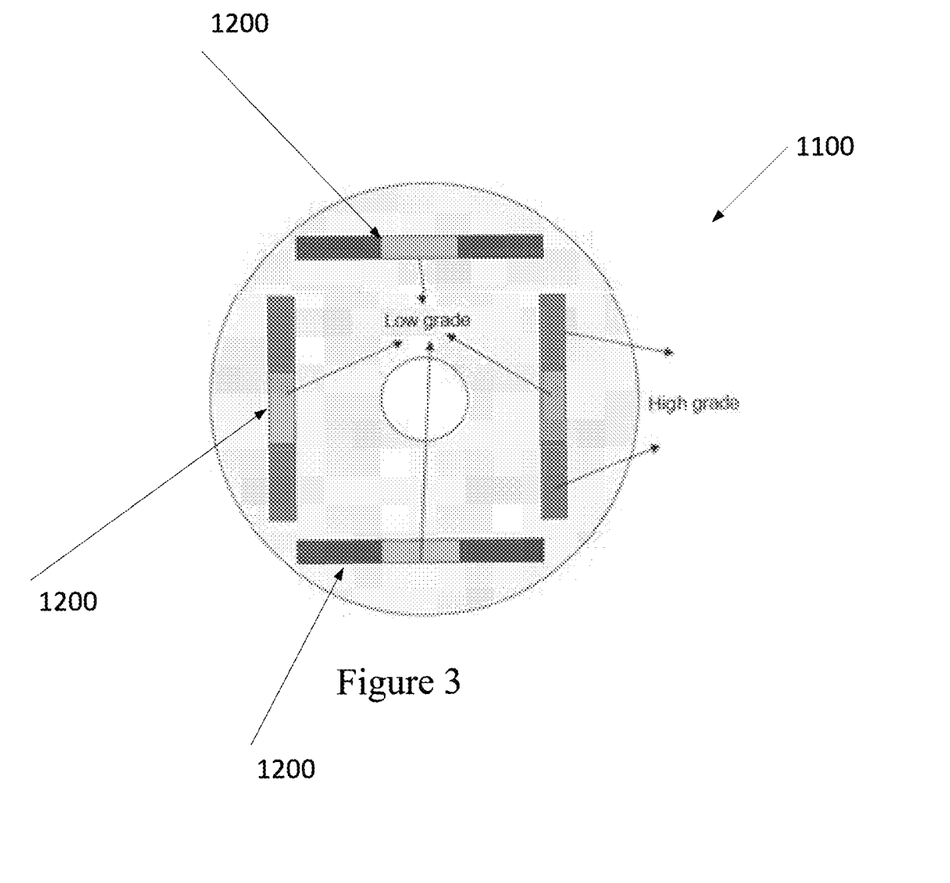
FIG. 3 illustrates the new magnet architecture and topology with non-consistent magnet configuration in which various aspects of the present disclosure may be implemented in accordance with one or more example embodiments.

FIG. 1 shows a conventional permanent magnet machine design. The design has two main components: the stator and the rotor. The stator, illustrated in FIG. 1, includes the steel lamination core with 40 slots with a five-phase winding configuration. The rotor, illustrated in FIG. 1, includes a four pole magnet segments architecture and a laminated core. In conventional machines, the magnetic material's properties are homogeneous. The homogeneous topology is arranged to have a sinusoidal counter-electromotive force, also known as Back Electromotive Force (BEMF) in the windings when the rotor spins inside the stator. Three phase electric machine drives utilizing non-sinusoidal BEMF reduces the performances and efficiency.

Referring to FIGS. 2-4 and 5A-5C and 6, the new technology of the present disclosure provides a five phase electric machine that can improve the performance and efficiency of older designs. Utilizing the new magnet architecture and topology of the new electric machine design 1000 enables the use of a non-sinusoidal waveform to control the electric machine drive system, which has the positive effect of improving the electric machine's counter-electromotive force (refer to herein as "counter EMF" or "CEMF"), also known as back electromotive force 1500 (or "back EMF"). The novel design described in the present disclosure improves the torque density and efficiency. Both factors reduce cost, improve performance, and reduce weight in the new electric machine 1000.

In the new construction of electric machine 1000 described in the present disclosure and a shown in FIGS. 2-5A-5C, each pole 1200 of the rotor's magnets includes a combination magnet or magnet assembly with varying strengths (non-consistent properties), for example, N35, N52. The strength of each the magnet is specified via its magnet remanence (e.g., residual magnetism) (Br in Tesla unit). The new rotor design 1100, shown in FIGS. 2, 3 and 4, the ratio of the low and high strength magnets as well as their angle lengths are provided for the induced voltage in the windings. In the present design 1000 having a trapezoidal BEMF with 18% of third harmonics on top of the sinusoidal BEMF, the five phase machine can produce 17% more torque while it fed with a trapezoidal symmetric five phase currents. In the novel design 1000 the high grade magnet has 17% more remanence than the low grade magnet (for example high grade magnet Br=1.44 T and low grade magnet Br=1.23 T) and the low grade magnet is 40% of the high grade magnet angle length (for example low grade magnet angle length=30 deg and high grade magnet angle length=75 deg). Hence in one aspect, the new design 1000 provides a new ratio of the angle length of the low grade magnet to high grade magnet. Further another aspect, the new machine design 1000 provides that magnet grades ratios for low grade and high grade magnets in the same rotor can be provided.

Figure 4:
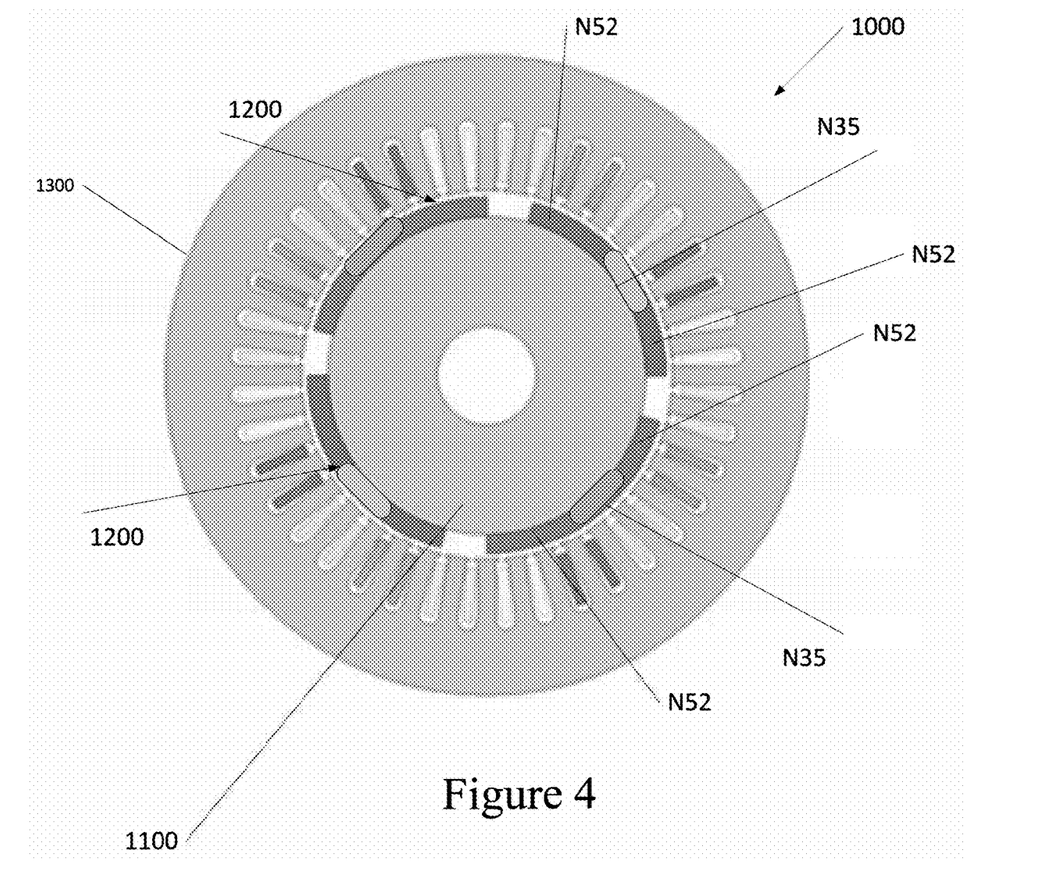
FIG. 4 illustrates the new interior permanent magnet architecture and topology with non-consistent magnet configuration in which various aspects of the present disclosure may be implemented in accordance with one or more example embodiments.
Figure 5:
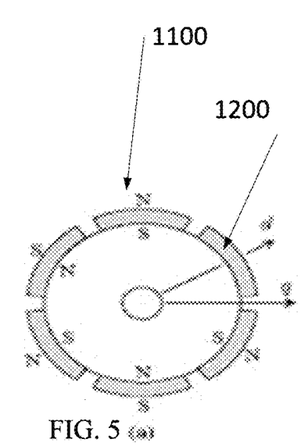
FIGS. 5A-5C and 6 illustrate the new magnet architecture and topology with back emf in which various aspects of the present disclosure may be implemented in accordance with one or more example embodiments.
Figure 6:
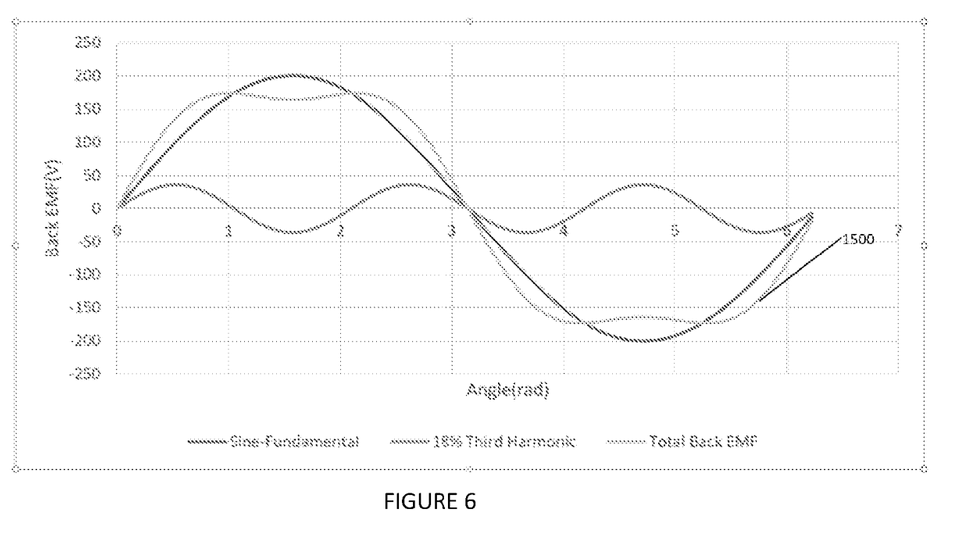

FIG. 4 illustrates a new electric machine 1000 design a stator 1300 and newly provided rotor 1100. The stator 1300 includes the steel lamination core with 40 slots with a five-phase winding configuration. The rotor 1100, illustrated in FIG. 4, includes magnet architecture and topology with a combination magnet with varying strengths (non-consistent properties), for example, N35, N52, with a four pole magnet 1200 as discussed above with regarding FIGS. 2 and 3. In another construction, a multi-phase machine 1000 magnet contains non rare-earth material such as, Ferrite and Alnico. In other constructions, the magnet 1200 can be rare earth material such as, Neyoadium and Samarium Cobalt. In a further construction, a multi-phase machine 1000 magnet contains combination of rare-earth and non-rare-earth materials as noted in the foregoing. In other aspects of the present disclosure, a multi-phase machine 1000 magnet pieces 1200 are separated by non-magnetic conductive materials. These non-conductive materials may be a ceramic or other material. In another construction, a multi-phase machine 1000 magnet pieces 1200 are attached with no space between them.

Referring to FIGS. 5A-5C, the magnet architecture and topology of the present disclosure can be of various constructions. In FIG. 5A, a multi-phase machine 1000 magnet poles 1200 may be disposed on the surface of the rotor. In yet another construction shown in FIG. 5B, a multi-phase machine 1000 magnet poles 1200 may be disposed inset on the rotor. In another construction shown in FIG. 5C, a multi-phase machine 1000 magnet poles 1200 may be buried inside the rotor. Further constructions include a multi-phase machine magnet poles placed as combination of surface mounted, buried and inset on the rotor.

Referring to FIGS. 2-4 and FIGS. 5A-5C, based on intensive modeling, utilizing state-of-the-art modeling software, the new machine design 1000 produces 17% more torque than a similarly sized (length and circumference) three phase machines. The new design offers a non-sinusoidal back EMF voltage (including 18% of third harmonic) in the windings of the five phase machine. Applying a non-sinusoidal current with 18% third harmonic to the windings creates a higher torque density while concurrently exhibiting current losses on similar with three phase electric machine drives.

The concept covers the five phase permanent magnet rotors configurations. Surface mounted type like FIG. 2 and interior permanent magnet rotor FIG. 3. The design discussed in this present disclosure, there are four pole rotors but it can apply to any number of rotor poles. The rotor lamination core can be designed in different structures like solid, with saliency and even with barriers inside. The new machine design can be applied to applications such as aerospace, automotive, and marine industries.

In some implementations of the present disclosure an electric machine includes five phases or more phases. In one implementation, a multi-phase electric machine includes a stator, and a rotor for rotating within the stator, the rotor including poles having combination magnet pieces with varying strengths and dimensions creating a non-sinusoidal back EMF. In some implementations, a multi-phase electric machine includes a stator, and a rotor for spinning within the stator, the rotor includes a plurality of poles having magnet assemblies includes at least a low strength magnet and a high strength magnet therein for creating a non-sinusoidal back EMF. In other implementations, a multi-phase electric machine includes a stator, and a rotor for spinning within the stator, the rotor including a plurality of poles having magnet assemblies includes at least a first magnet and second magnet therein for creating a non-sinusoidal back EMF wherein a strength ratio of the first magnet and second magnet greater than the absolute value of 1.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A multi-phase electric machine, comprising:
a stator, and a rotor for rotating within the stator, the rotor including poles having magnet assemblies with different magnetic strengths and dimensions creating a non-sinusoidal back EMF with 18% third harmonics.

2. The multi-phase electric machine according to claim 1, wherein the machine has five phases.

3. The multi-phase electric machine according to claim 1, wherein the magnet assemblies include magnetic pieces being separated by a non-magnetic conductive material.

4. The multi-phase electric machine according to claim 3, wherein the magnet pieces are attached with no space between them.

5. The multi-phase electric machine according to claim 1, wherein the magnet poles generate third harmonics in the back EMF.

6. The multi-phase electric machine according to claim 1, wherein the back EMF contains higher order harmonics improving torque or efficiency.

7. The multi-phase electric machine according to claim 1, wherein the magnet assemblies contain rare-earth material.

8. The multi-phase electric machine according to claim 1, wherein the combination magnet assemblies contains no rare-earth material.

9. The multi-phase electric machine according to claim 1, wherein the magnet assemblies contains combination of rare-earth and non-rare-earth materials.

10. The multi-phase electric machine according to claim 1, wherein the magnet poles are placed on the surface of the rotor.

11. The multi-phase electric machine according to claim 1, wherein the magnet poles are buried inside the rotor.

12. The multi-phase electric machine according to claim 1, wherein the magnet poles are located inset on the rotor.

13. The multi-phase electric machine according to claim 1, wherein the magnet poles are placed as combination of surface mounted, buried and inset on the rotor.

14. A multi-phase electric machine, comprising:
a stator, and a rotor for spinning within the stator, the rotor including a plurality of poles having magnet assemblies includes at least a first magnet and second magnet therein for creating a non-sinusoidal back EMF of 18% third harmonics wherein a strength ratio of the first magnet and second magnet greater than the absolute value of 1.

15. The multi-phase electric machine according to claim 14, wherein the machine has five phases.

16. The multi-phase electric machine according to claim 14, wherein the magnets are separated by a non-magnetic conductive material.

17. The multi-phase electric machine according to claim 14, wherein the magnets are attached with no space between them.

18. The multi-phase electric machine according to claim 14, wherein the magnet poles generate third harmonics in the back EMF.

19. The multi-phase electric machine according to claim 14, wherein the back EMF contains higher order harmonics improving torque or efficiency.

20. The multi-phase electric machine according to claim 14, wherein the magnet assemblies contains rare-earth material.

21. The multi-phase electric machine according to claim 14, wherein the magnet assemblies contains non-rare-earth material.

22. The multi-phase electric machine according to claim 14, wherein the magnet assemblies contains combination of rare-earth and non-rare-earth materials.

23. The multi-phase electric machine according to claim 14, wherein the magnet poles are placed on the surface of the rotor.

24. The multi-phase electric machine according to claim 14, wherein the magnet poles are buried inside the rotor.

25. The multi-phase electric machine according to claim 14, wherein the magnet poles are located inset on the rotor.

26. The multi-phase electric machine according to claim 14, wherein the magnet poles are placed as combination of surface mounted, buried and inset on the rotor.

* * * * *